US008537992B2

(12) United States Patent
Sullivan et al.

(10) Patent No.: US 8,537,992 B2
(45) Date of Patent: Sep. 17, 2013

(54) SYSTEM AND METHOD FOR RECORDING COMMUNICATION ACTIVITIES

(75) Inventors: Marc Sullivan, Austin, TX (US); James Pratt, Round Rock, TX (US); Steven M. Belz, Cedar Park, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1326 days.

(21) Appl. No.: 12/056,130

(22) Filed: Mar. 26, 2008

(65) Prior Publication Data

US 2009/0245494 A1 Oct. 1, 2009

(51) Int. Cl.

| | |
|---|---|
| ***H04M 1/56*** | (2006.01) |
| ***H04M 15/06*** | (2006.01) |
| ***H04M 15/00*** | (2006.01) |

(52) U.S. Cl.
USPC .................. 379/142.01; 379/142.06; 379/133

(58) Field of Classification Search
USPC ................ 379/142.01, 142.06, 201.1, 266.1, 379/133, 134
See application file for complete search history.

(56) References Cited

U.S. PATENT DOCUMENTS

| | | | | |
|---|---|---|---|---|
| 6,738,462 | B1 * | 5/2004 | Brunson | 379/142.06 |
| 6,882,714 | B2 | 4/2005 | Mansfield | |
| 2004/0062383 | A1 * | 4/2004 | Sylvain | 379/265.06 |
| 2006/0002536 | A1 * | 1/2006 | Ambrose | 379/201.01 |
| 2006/0116113 | A1 | 6/2006 | Gass | |
| 2008/0059627 | A1 * | 3/2008 | Hamalainen et al. | 709/224 |

* cited by examiner

*Primary Examiner* — Quoc D Tran

(74) *Attorney, Agent, or Firm* — Guntin & Gust, PLC; Andrew Gust

(57) ABSTRACT

A system that incorporates teachings of the present disclosure may include, for example, a system having a controller to monitor incoming and outgoing calls associated with one or more communication devices, identify communication identifiers initiating the incoming calls and communication identifiers targeted by the outgoing calls, determine one or more related communication identifiers for each of the initiating and targeted communication identifiers, record in a communications log the incoming calls with the initiating communication identifiers and one or more related communication identifiers, and record in the communications log the outgoing calls with the targeted communication identifiers and one or more related communication identifiers. Other embodiments are disclosed.

25 Claims, 7 Drawing Sheets

100

SHS
130
ISP
Network
132
VHO 1
VHO 2
VHO 3
VHO 4
VHO 5
VHO 6
VHS
LAN
115
117
108
STB 106
G 104
Ctrl 107
STB 106
Satellite dish
receiver 131
ISP
Network
132
102
108
116
Remote
Services

400

500

SYSTEM AND METHOD FOR RECORDING COMMUNICATION ACTIVITIES

FIELD OF THE DISCLOSURE

The present disclosure relates generally to communication systems and more specifically to a system and method for recording communication activities.

BACKGROUND

Typically cell phones, fixed line phone terminals, and like communication devices record information about incoming and outgoing calls in a communications log. The communications log can be used by a user of a communication device to review a caller identification of incoming calls and numbers dialed by the user. The user can also utilize the communications log for fast dialing of phone numbers.

DETAILED DESCRIPTION

One embodiment of the present disclosure entails a method involving monitoring incoming communications and outgoing communications associated with one or more communication devices, identifying communication identifiers initiating the incoming communications and communication identifiers targeted by the outgoing communications, determining one or more related communication identifiers for at least one of the initiating and targeted communication identifiers, and recording in a communications log at least one of the initiating communication identifiers and their corresponding one or more related communication identifiers and the targeted communication identifiers and their corresponding one or more related communication identifiers. The one or more related communication identifiers can be acted upon to establish communications.

Another embodiment of the present disclosure entails a system having a controller to monitor incoming and outgoing calls associated with one or more communication devices, identify communication identifiers initiating the incoming calls and communication identifiers targeted by the outgoing calls, determine one or more related communication identifiers for each of the initiating and targeted communication identifiers, record in a communications log the incoming calls with the initiating communication identifiers and one or more related communication identifiers, and record in the communications log the outgoing calls with the targeted communication identifiers and one or more related communication identifiers. The one or more related communication identifiers can be acted upon to establish communications.

Yet another embodiment of the present disclosure entails a computer-readable storage medium having computer instructions for distributing a communications log to one or more communication devices, the communications log comprising an aggregation of incoming and outgoing communications associated with the one or more communication devices, wherein at least one entry in the communications log comprises a communication identifier initiating one of the incoming or outgoing communications and one or more alternative communication identifiers for establishing communications.

Another embodiment of the present disclosure entails a computer-readable storage medium having computer instructions for receiving a communications log, the communications log comprising an aggregation of incoming and outgoing communications associated with one or more communication devices, wherein at least one entry in the communications log comprises a communication identifier initiating one of the incoming or outgoing communications and one or more related communication identifiers. The one or more related communication identifiers can be acted upon to establish communications.

Figure 1:
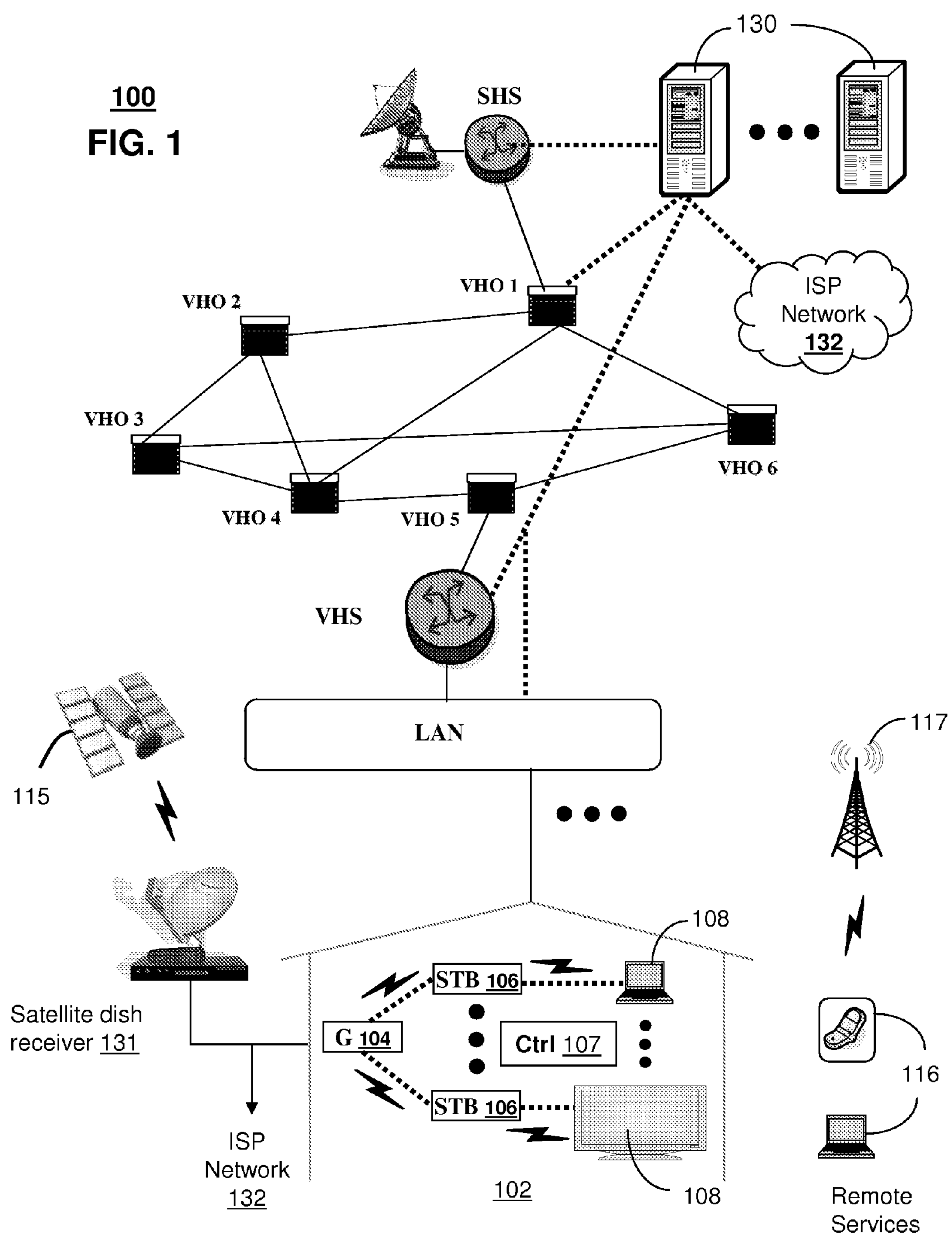
FIGS. 1-4 depict exemplary embodiments of communication systems that provide media services.

FIG. 1 depicts an exemplary embodiment of a first communication system 100 for delivering media content. The communication system 100 can represent an Internet Protocol Television (IPTV) broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

Another distinct portion of the one or more computing devices 130 can be used as a logging system 130 for monitoring incoming and outgoing communications for one or more communication devices such as the STB 106, the inhouse computer 108, the cell phone 116, the portable computer 116, and so on. The logging system 130 can also include a presence system as centralized component, or decentralized component remotely accessible by the logging system. The presence system can utilize common computing and communications technology to monitor communication devices operating in communication system 100 (e.g., cell phone, home phone, office phone, home computer, office computer, STB, and so on) by way of the network elements of the communication system.

The presence system can for example monitor communication activities of the ISP network 132 to determine whether a subscriber of the communication system 100 is utilizing an office or home computer. The presence system can also monitor whether the subscriber is utilizing a cellular phone by monitoring the subscriber's location. For instance, the presence system can monitor that the cellular phone is transitioning between cellular base stations 117, which can indicate to the presence system that the subscriber is in transit (traveling in a car, or train). In another illustrative embodiment, or in combination, the presence system can request location coordinates from a cellular phone incorporating a Global Positioning System (GPS) receiver, or utilize triangulation with three or more base stations 117 to hone in on an area where the cellular phone is operating. In another illustrative embodiment, the presence system can monitor network elements of communication system 100 to detect that the subscriber has downloaded a VoD movie and is presently viewing the movie.

Generally speaking, the presence system can be programmed to monitor the location and activities of a subscriber of the communication system by monitoring the use of any of the subscriber's available communication devices in communication system 100.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
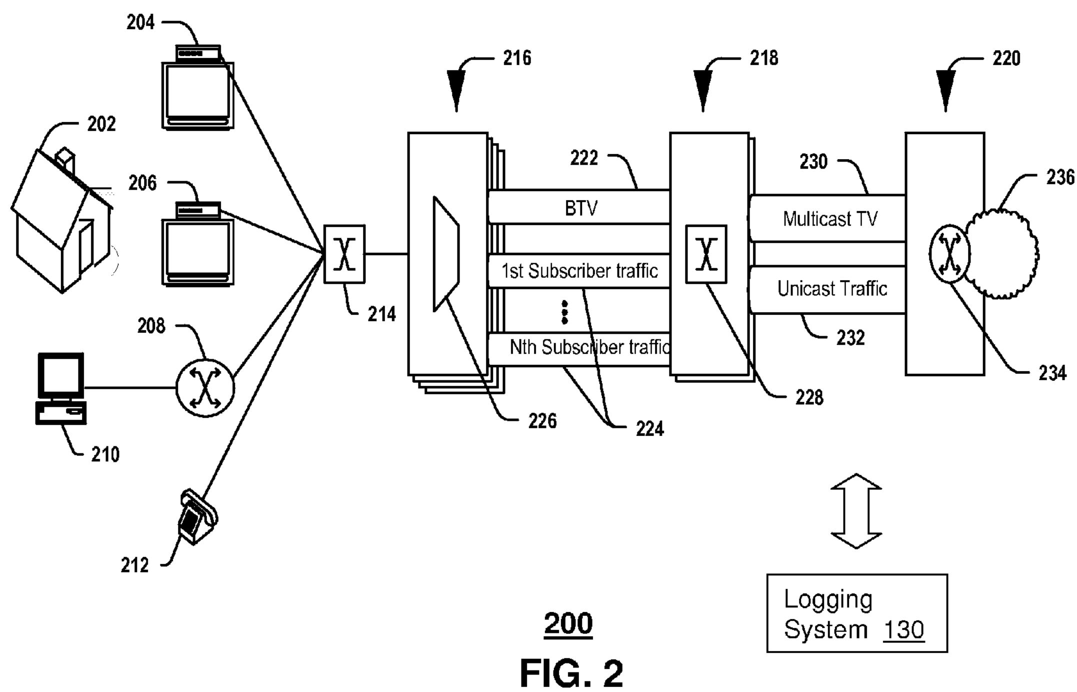

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The logging system 130 of FIG. 1 can be operably coupled to the second communication system 200 for purposes similar to those described above.

Figure 3:
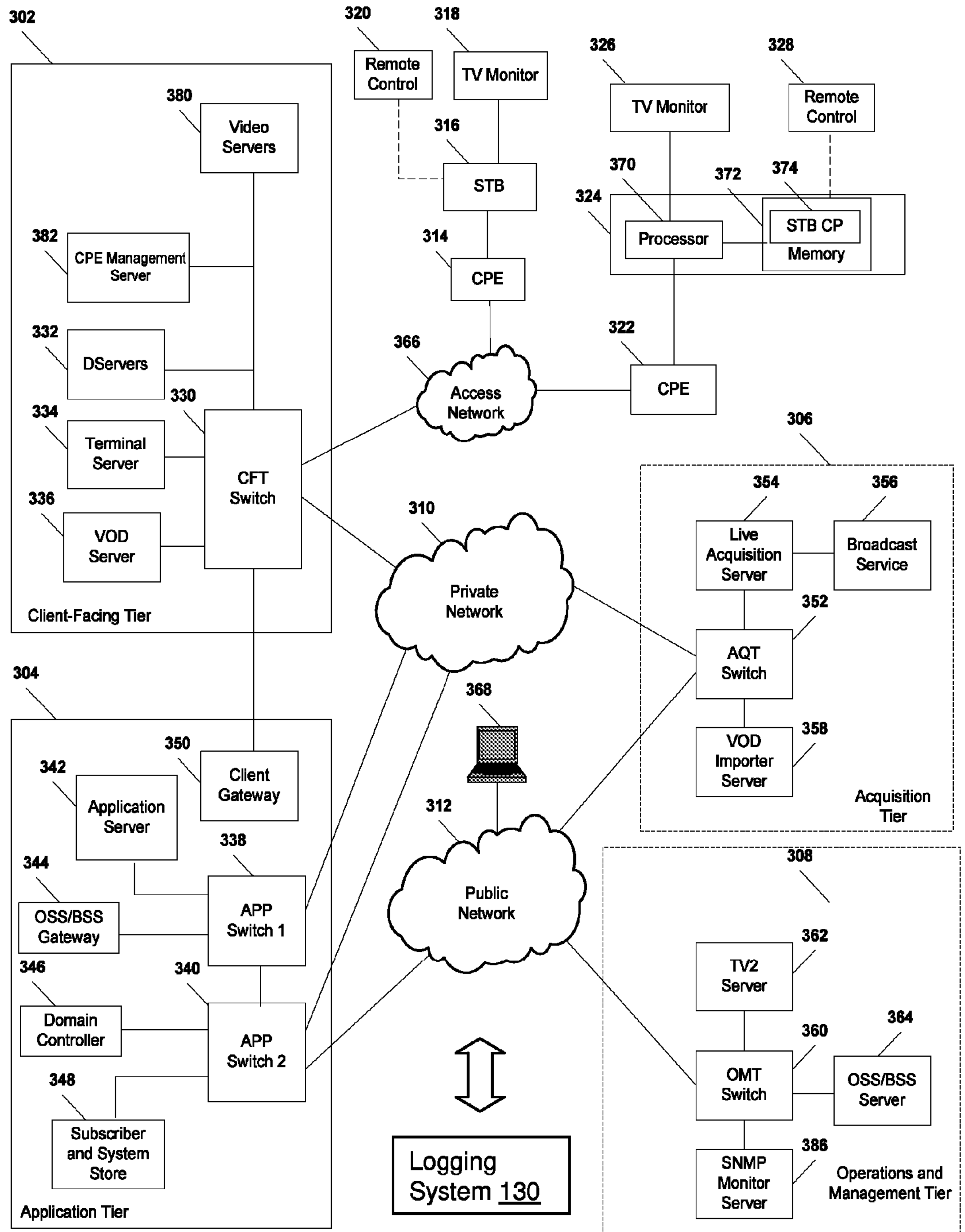

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The logging system 130 of FIGS. 1-2 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
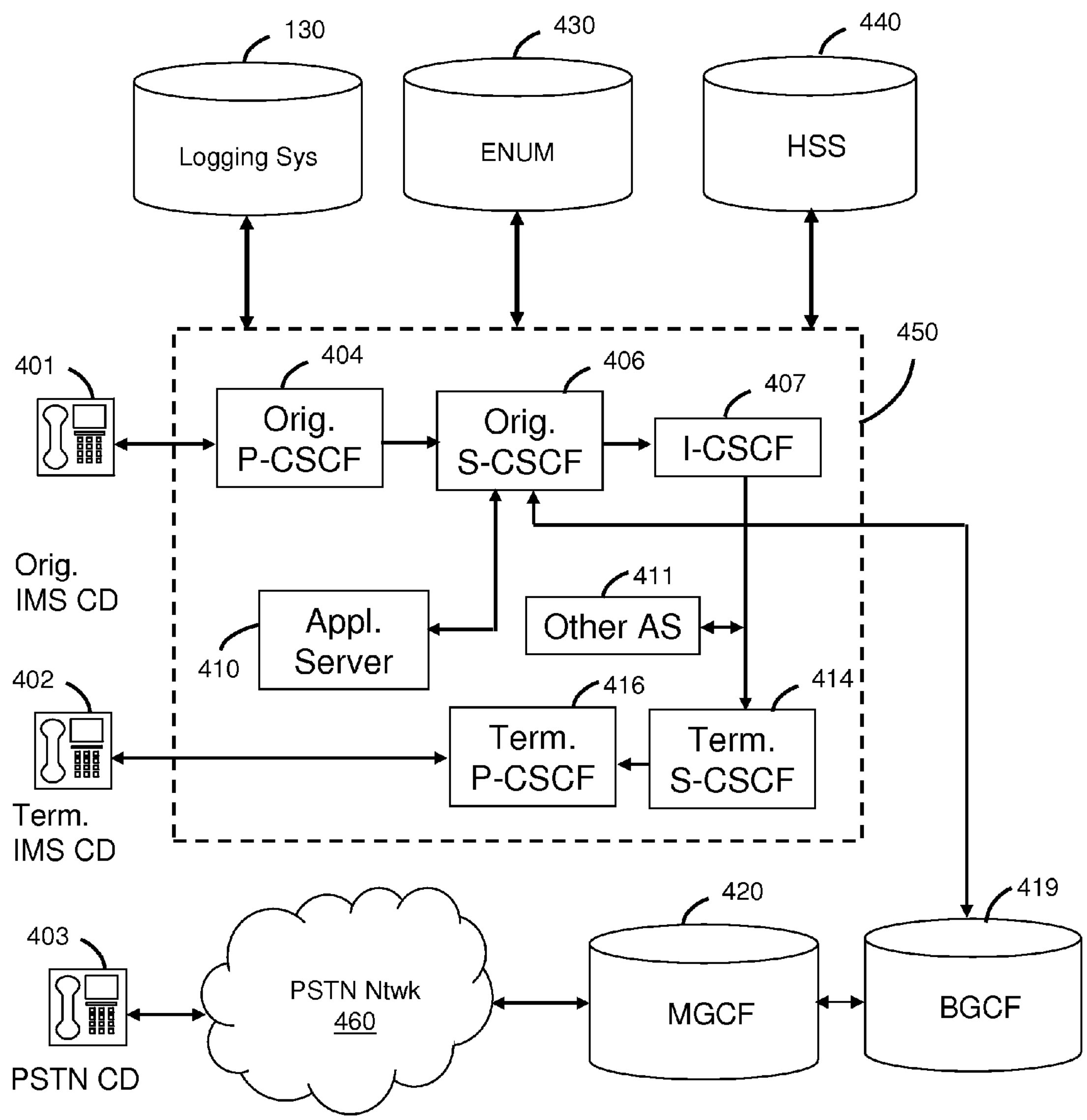

FIG. 4 depicts an exemplary embodiment of a communication system 400 employing a IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) support by the HSS 440. To accomplish a communication session between CDs, an originating IMS CD 401 can submit a SIP INVITE message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the logging system 130 previously discussed for FIG. 1. In this representative embodiment, the logging system 130 can be accessed over a PSTN or VoIP channel of communication system 400 by common techniques such as described above.

Figure 5:
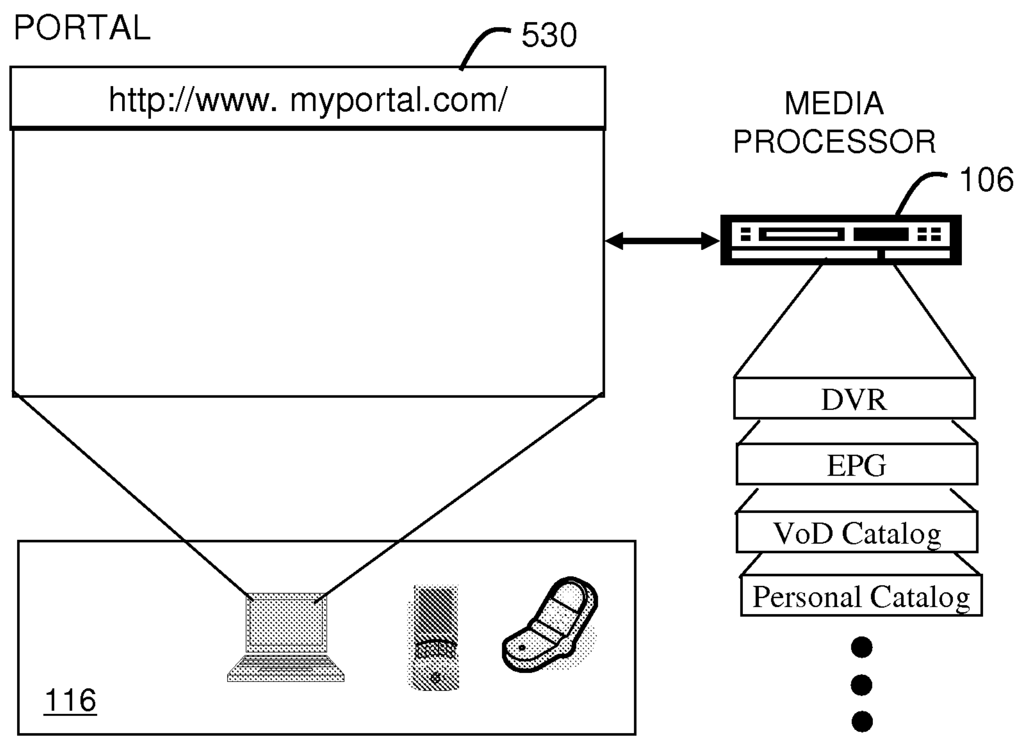
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), and so on.

Figure 6:
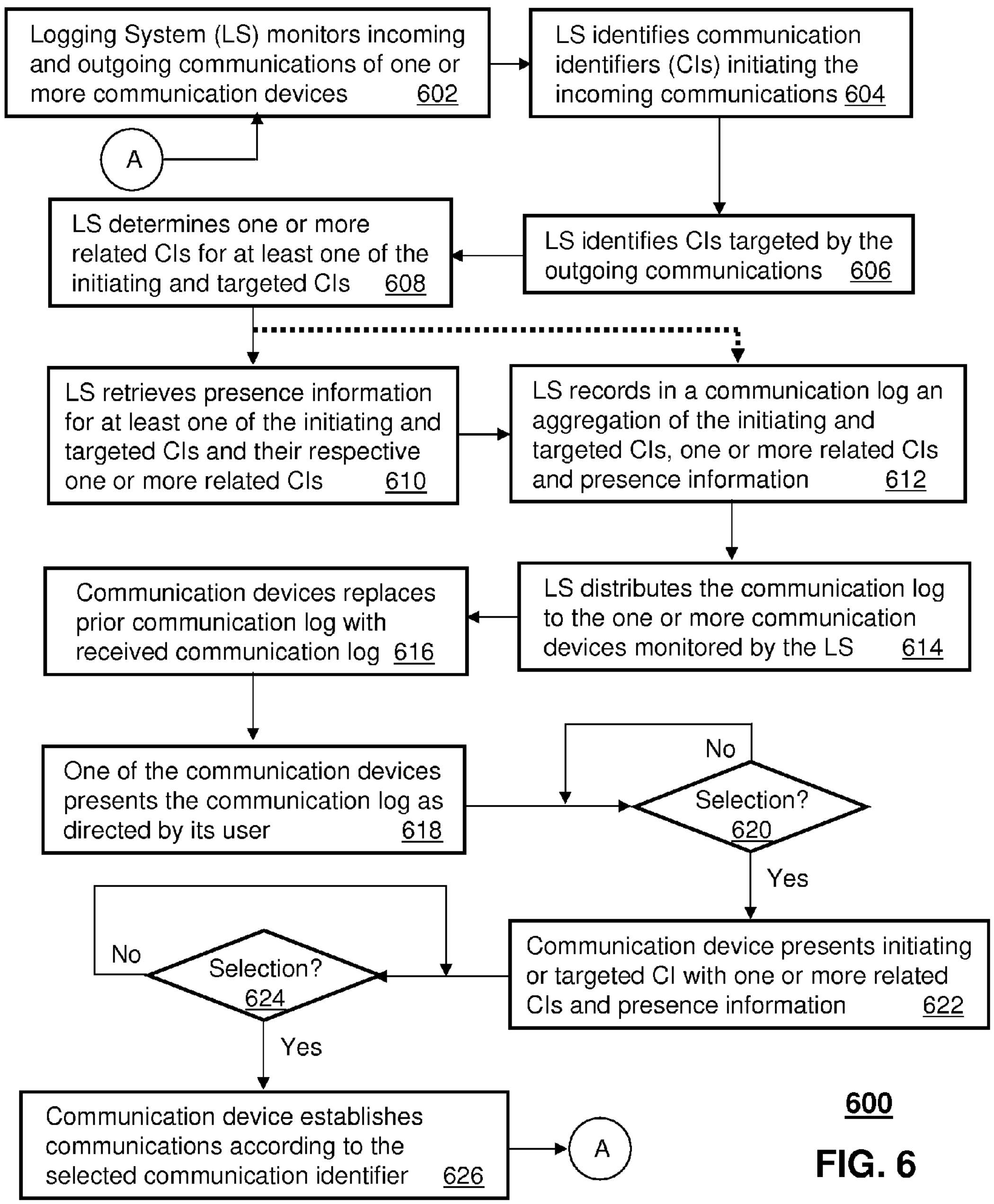
FIG. 6 depicts an exemplary method operating in portions of the communication systems of FIGS. 1-4.

FIG. 6 depicts an exemplary method 600 operating in portions of communication systems 100-400. Method 600 begins with step 602 in which the logging system (LS) 130 monitors incoming and outgoing communications of one or more communication devices such as the STBs, computers, cell phones, or VoIP home and office phones of FIGS. 1-4. The one or more communication devices can be logically grouped as communication devices of a select subscriber of communication systems 100-400. The communication activities can include voice messaging, data messaging, and video messaging. Data messaging can include communicating activities such as instant messaging, email messaging, short messaging service (SMS) or multimedia messaging service (MMS) messaging over a wireless medium, and Internet browsing, just to mention a few.

The LS 130 can monitor in whole or in part with common communication techniques incoming and outgoing communications at the communication devices themselves and/or at intermediate network elements initiating the communication activities. For each incoming or outgoing communication, the LS 130 can identify in steps 604-606 a corresponding communication identifier associated the communication. For example, incoming communications can be identified by a communicating identifier initiating the communication. Similarly, outgoing communications emanating from one of the monitored communication devices can be identified by a communication identifier targeted by the monitored communication device. In the present context, a communication identifier can represent any identifier that can be used to establish communications with a targeted device. For example, an initiating or targeted communication identifier can be represented by an E.164 telephone number, a SIP URI, an email address, an instant messaging address, an SMS or MMS messaging address, or a uniform resource locator (URL).

Once the LS 130 has identified the initiating and targeted communication identifiers associated with the incoming and outgoing communications, respectively, the LS can proceed to step 608 where it determines one or more related communication identifiers for at least one of the initiating and targeted communication identifiers. In an illustrative embodiment, the LS 130 can perform this step for incoming and outgoing communications associated with subscribers of the same communication system. That is, an initiating or targeted communication identifier can be used to identify a subscriber account for one of the media communication systems of FIGS. 1-4, which can then inform the LS 130 of other available communication identifiers for the identified subscriber.

For example, suppose a subscriber has procured Internet, email, instant messaging, cellular, and VoIP communications from the same service provider. Knowing the communication identifier of one of these services can be used to identify a subscriber account that identifies the other communication services procured by the subscriber and consequently the communication identifiers associated with those other services. In another illustrative embodiment, a subscriber can procure communication services from more than one service provider. In this instance, some or all of the service providers can have intra-service agreements in which each service provider shares subscriber account information with the other in order for the LS 130 to identify other communication identifiers corresponding to the same party.

The related communication identifiers can thus represent another E.164 telephone number or SIP URI, another email address, another instant messaging address, another SMS or MMS address, or another URL each determined from a subscriber account selectively found with the initiating or targeted communication identifier. For example, suppose an initiating communication identifier of a calling party corresponds to a cell phone of said party. Further assume the related communication identifiers of said party correspond to a home phone number, an office phone number, an office email address, a personal email address, an instant messaging address, and an SMS or MMS address of the cell phone, each of which is listed in a subscriber account of said party which can be found with the initiating communication identifier, which in this illustration is the cell phone number.

In step 610, the LS 130 can also be directed to retrieve presence information from the presence system for at least one of the initiating and targeted communication identifiers and their corresponding one or more related communication identifiers. The presence information can indicate a likelihood of establishing communications with a party reachable at one of the initiating or targeted communication identifiers and its corresponding one or more related communication identifiers. Referring back to the illustration above, the initiating communication identifier as noted earlier may be a cell phone number, while the related communication identifiers may be the home phone number, the office phone number, the office email address, the personal email address, the instant messaging address, and the SMS or MMS address of the cell phone. The presence information can indicate that the party which initiated communications with the cell phone is now available by way of the home phone and the cell phone has been turned off. A presence indicator can be associated with the communication identifier most likely to establish communications with the calling party (e.g., the home phone number).

The LS 130 can record in step 612 in a communication log an aggregate collection of the initiating and targeted communication identifiers of all the monitored communication devices. And when available, one or more related communication identifiers and/or presence information can also be included in the entries of the communication log. The communication log can also identify which communication device is associated with each entry in the communication log. For example, suppose three communication devices of a subscriber (a home phone, cell phone, and office phone) have been monitored. Each entry in the communication log can be tagged with an identification of the communication device receiving the incoming communication or initiating the outgoing communication. Other common information such as a time stamp indicating when the communication was initiated can be inserted in each entry of the communication log.

The LS 130 can distribute in step 614 the communication log to the one or more monitored communication devices. The communication log can be distributed over a fixed line communication interface (e.g., ISP network 132 over a xDSL or cable interface) or over a wireless medium (e.g., WiFi, cellular) depending on the capability of the receiving communication device. The communication log can be distributed as a binary or text file, or other suitable format which can be processed by the receiving communication device. Additionally, the communication log can be distributed in any communication format which can be processed by the receiving communication device (e.g., email, SMS, MMS, etc.).

The communication devices can in turn replace in step 616 a prior communication log with the received log. Accordingly, each communication device can have an identical communication log with tags in each entry identifying communication device associated with a select incoming or outgoing communication. In step 618, one of the communication devices can present the communication log as directed by a user by way of common user interface (UI) navigated with a common keypad and/or navigation disk and/or selector of the communication device. The communication device can present the communication log with the incoming communication entries in one instance of the UI, while the outgoing communication entries can be presented in another instance of the UI, or both instances can be combined in one UI. Each entry of the communication log can show a communication identifier associated with the incoming or outgoing communication.

In step 620, the communication device can detect a selection by the user of one of the incoming or outgoing communication entries. When a selection is made, the communication device can present in step 622 an initiating communication identifier (when an incoming communication entry is selected) or a targeted communication identifier (when an outgoing communication entry is selected) with one or more related communication identifiers and a presence indicator (if available). The expansive list of communication identifiers and presence indicator can guide the user in selecting a communication identifier to respond to the incoming communication or to re-initiate the outgoing communication.

If a communication identifier selection is detected in step 624, the communication device can be directed in step 626 to establish communications according to the selected communication identifier. As before, the LS 130 can be directed to log the outgoing communication, aggregate the results with other monitored communications, and distribute a communication log to the communication devices with the expansive communication features previously described.

Method 600 provides a user with a plurality of possible communication devices available at his/her disposal a means to utilize a communication log with a collective history across the user's communication devices. Accordingly, the user would no longer have to review outgoing or incoming communication logs independently recorded in a communication log of each communication device to respond to incoming communications or re-initiate outgoing communications.

Upon reviewing the aforementioned embodiments, it would be evident to an artisan with ordinary skill in the art that said embodiments can be modified, reduced, or enhanced without departing from the scope and spirit of the claims described below. For example, method 600 can be adapted so that the LS 130 establishes on behalf of the communication device communications according to the communication identifier selected in step 624. This adaptation can be accomplished by the communication device conveying a message to the LS 130 indicating which the communication identifiers has been chosen.

In another illustrative embodiment, the LS 130 can represent a base unit of a cordless phone system with more than one cordless phone coupled wirelessly thereto using for example a digitally enhanced cordless telephone (DECT) protocol for communicating with the cordless handsets. In another illustrative embodiment, method 600 can be adapted so that presence information is not presented. In yet another illustrative embodiment, method 600 can be adapted so that one of the communication identifiers in a log entry can be recorded by the communication device in a contact book or bookmarked in a browser as directed by a user of the communication device.

Other suitable modifications that can be applied to the present disclosure without departing from the scope of the claims below. Accordingly, the reader is directed to the claims section for a fuller understanding of the breadth and scope of the present disclosure.

Figure 7:
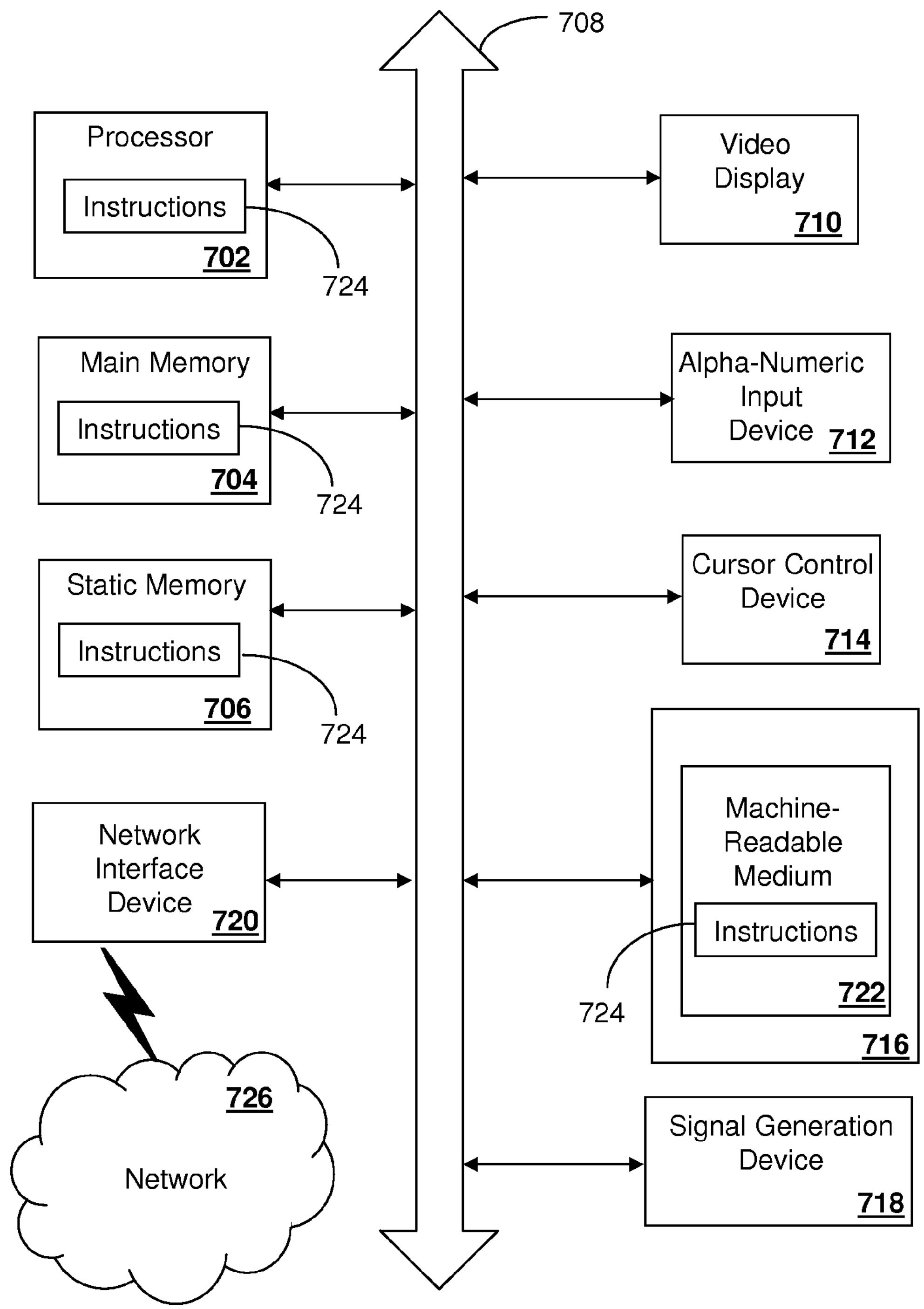
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

receiving monitoring information for incoming communications and outgoing communications associated with a communication device, wherein the monitoring information is based on monitored communication activity at a network element without monitoring communication activity at the communication device and without monitoring communication activity at target communication devices;

identifying communication identifiers initiating the incoming communications and communication identifiers targeted by the outgoing communications;

identifying a subscriber associated with at least one of the identified initiating and targeted communication identifiers;

identifying a subscriber account for the identified subscriber;

obtaining subscriber information based on the identified subscriber account, wherein the subscriber information is accessible based on an intra-service agreement between different service providers to share subscriber data with each other for a same party via distributed databases;

determining, by a processor, a related communication identifier associated with the at least one of the initiating and targeted communication identifiers based on the obtained subscriber information, wherein the related communication identifier can be acted upon to facilitate establishing communications; and recording in a communications log the initiating communication identifiers, the targeted communication identifiers and the related communication identifier.

2. The method of claim 1, comprising identifying the target communication devices that are associated with each of the incoming and outgoing communications, wherein the processor comprises a base station of a cordless phone system, and wherein the communication device comprises a cordless telephone communicating with the base station utilizing a digitally enhanced cordless telephone protocol.

3. The method of claim 2, comprising:

recording in the communications log an identification of the target communication devices associated with each of the incoming and outgoing communications; and providing log information from the communications log to a web browser for bookmarking responsive to user input at the communication device.

4. The method of claim 1, wherein the initiating communication identifier is associated with a calling party communication device attempting to establish communications with the communication device and wherein the targeted communication identifier is associated with a called party communication device targeted by the communication device.

5. The method of claim 1, wherein the processor is operated by a first service provider, wherein the processor obtains the subscriber information based on the identified subscriber account from a second service provider based on the intra-service agreement between the first and second service providers, and wherein the initiating and targeted communication identifiers comprise E.164 telephone numbers.

6. The method of claim 5, wherein the related communication identifier comprises a session initiation protocol uniform resource identifier.

7. The method of claim 1, wherein the initiating and targeted communication identifiers comprise a short messaging service messaging address.

8. The method of claim 2, comprising distributing the communications log to the target communication devices, wherein the communications log includes communication identifier information for a group of end user devices associated with a user, wherein the group of end user devices includes the communication device.

9. The method of claim 1, comprising:

distributing the communications log to the communication device;

presenting the communications log at the communication device;

detecting a selection of a communication entry in the communications log; and presenting a communication identifier and the related communication identifier associated with the selected entry.

10. The method of claim 9, comprising:

detecting a selection of the related communication identifier; and facilitating establishing communications according to the selection.

11. The method of claim 1, comprising:

retrieving presence information for the related communication identifier; and recording in the communications log a presence indicator based on the presence information.

12. The method of claim 11, comprising:

distributing the communications log to the communication device;

presenting the communications log at communication device;

detecting a selection of a communication entry in the communications log with a presence indicator; and presenting the communication identifier and the related communication identifier associated with the selected entry with the presence indicator.

13. The method of claim 11, wherein the presence indicator indicates a likelihood of establishing communications with a called party reachable via the related communication identifier.

14. A system, comprising:

a memory storing computer instructions; and a controller coupled to the memory, wherein the controller in response to executing the computer instructions performs operations comprising:

monitoring incoming and outgoing calls associated with a communication device, wherein the monitoring is based on monitored communication activity at a network element without monitoring communication activity at the communication device and without monitoring communication activity at target communication devices;

identifying communication identifiers initiating the incoming calls and communication identifiers targeted by the outgoing calls;

obtaining subscriber information from a database based on the identified initiating and targeted communication identifiers;

determining related communication identifiers for the initiating and targeted communication identifiers based on the obtained subscriber information, wherein the related communication identifiers are configured to be utilized to facilitate establishing communications;

recording in a communications log the incoming calls with the initiating communication identifiers and the corresponding related communication identifiers; and recording in the communications log the outgoing calls with the targeted communication identifiers and the corresponding related communication identifiers.

15. The system of claim 14, wherein the controller in response to executing the computer instructions is configured to:

identify a subscriber associated with at least one of the identified initiating and targeted communication identifiers;

identify a subscriber account for the identified subscriber, wherein the obtaining of the subscriber information is based at least in part on the identified subscriber account;

identify the target communication devices that are associated with each of the incoming and outgoing calls; and record in the communications log an identification of the target communication devices that are associated with each of the incoming and outgoing communications.

16. The system of claim 14, wherein the initiating and targeted communication identifiers comprise an E.164 telephone number, and a Session Initiation Protocol Uniform Resource Identifier, and wherein the related communication identifiers comprise an instant messaging address, a short messaging service message address, and a multimedia messaging service address.

17. The system of claim 14, wherein the controller in response to executing the computer instructions is configured to distribute the communications log to the target communication devices associated with the incoming and outgoing calls, and wherein the subscriber information is accessible based on an intra-service agreement between different service providers to share subscriber data for a same party.

18. The system of claim 17, wherein the controller in response to executing the computer instructions is configured to:

retrieve presence information for at least a portion of the initiating and targeted communication identifiers and their corresponding related communication identifiers; and record in the communications log a presence indicator based on the presence information.

19. The system of claim 14, wherein the communication device comprises a wireless communication device, and wherein the system comprises an internet protocol multimedia subsystem.

20. A non-transitory computer-readable storage medium, comprising computer instructions which in response to being executed by a processor cause the processor to perform operations comprising:

adjusting a communications log; and distributing the communications log to a communication device, the communications log comprising an aggregation of incoming and outgoing communications associated with the communication device that is based on monitored communication activity at a network element without monitoring communication activity at the communication device and without monitoring communication activity at target communication devices, wherein an entry in the communications log comprises a communication identifier initiating one communication of the aggregation of incoming and outgoing communications and comprises an alternative communication identifier related to the one communication for facilitating establishing communications, wherein the alternative communication identifier is obtained from subscriber information that is accessible based on an intra-service agreement between different service providers to share subscriber data for a same party.

21. The non-transitory computer-readable storage medium of claim 20, wherein the adjusting of the communications log is based on recording in the communications log presence information associated with the alternative communication identifier;

wherein the processor is in communication with an internet protocol multimedia subsystem;

wherein the communication identifier initiating the one communication comprises a session initiation protocol uniform resource identifier; and wherein the alternative communication identifier comprises a uniform resource locator.

22. A non-transitory computer-readable storage medium, comprising computer instructions which in response to being executed by a processor cause the processor to perform operations comprising:

receiving a communications log, the communications log comprising an aggregation of incoming and outgoing communications associated with a communication device, wherein an entry in the communications log comprises a communication identifier initiating one communication of the aggregation of the incoming and outgoing communications and a related communication identifier, wherein the related communication identifier is configured for use to facilitate establishing communications, wherein the related communication identifier is obtained from subscriber information that is accessible based on an intra-service agreement between different service providers to share subscriber data for a same party, wherein the aggregation of the incoming and outgoing communications is generated based on monitored communication activity at a network element without monitoring communication activity at end user communication devices associated with the incoming and outgoing communications; and initiating communications with a called party device according to a selection of the related communication identifier.

23. The non-transitory computer-readable storage medium of claim 22, wherein the communications log comprises presence information associated with the related communication identifier, wherein the presence information indicates a likelihood of establishing communications with the called party reachable at the related communication identifier, and wherein the storage medium comprises computer instructions for replacing a stored communications log with the received communications log.

24. The non-transitory computer-readable storage medium of claim 22, wherein the processor comprises a base station of a cordless phone system, and wherein the communication device comprises a cordless telephone communicating with the base station utilizing a digitally enhanced cordless telephone protocol.

25. The non-transitory computer-readable storage medium of claim 22, comprising computer instructions for recording in a contact book the related communication identifier.

* * * * *